Patented Aug. 25, 1953

2,650,186

UNITED STATES PATENT OFFICE 2,650,186

RODENTICIDAL COMPOSITIONS

Gerhard Hecht, Wuppertal-Vohwinkel, Hans Henecka, Wuppertal-Elberfeld, and Marianne Meisenheimer, Leverkusen-Bayerwerk, Germany, assignors to Farbenfabriken Bayer Aktiengesellschaft, Leverkusen, Germany, a corporation of Germany No Drawing. Application December 10, 1949, Serial No. 132,408. In Switzerland December 22, 1948

3 Claims. (Cl. 167—46)

The present invention relates to new rodenticides and rodent baits and more particularly to rodenticides and rodent baits containing, as a poisonous ingredient, a condensation product of sulfuryl amide and formaldehyde.

For killing rodents elementary phosphorus and thallium compounds are generally used. Although these materials have a sufficient toxicity, they show various disadvantages in their application. Thus they are either badly taken, are not sufficiently stable or too expensive. It has further been proposed to use organic compounds, such as strychnine for this purpose. This compound which has become practically important shows, however, great disadvantages: e. g. it is badly taken on account of its bitter taste. Also the use of certain aromatic diazo compounds has recently been suggested, which compounds are well taken by the rodents and possess a sufficient toxicity.

According to the present invention a condensation product of sulfuryl amide [$SO_2(NH_2)_2$] and formaldehyde has now proved to be particularly suited for combating rodents. This compound corresponds to the empirical formula ($C_2H_4O_2.N_2S$)$_2$, and has a decomposition point of 255–260° C. According to the formula the molar ratio in which the reactants have condensed, is 1:2. This new condensation product is obtained by reacting sulfuryl amide with formaldehyde in concentrated aqueous mineral acid, preferably in hydrochloric acid or sulfuric acid. Already at room temperature a finely crystalline condensation product is formed in a short time. The product is only slightly soluble in water, alkalies and dilute acids, further in alcohol, ether, benzene and ligroine, and moderately soluble in glacial acetic acid and acetone; it can be recrystallized e. g. from acetone.

The said condensation product is distinguished by a very high toxicity; the compound is more poisonous than strychnine, and, therefore, very effective when used in rodenticides and rodent baits. In consequence of the high toxicity of the compound only small quantities of the poison need to be added to the baits, so that the taste of the baits will not be influenced thereby.

The following examples illustrate the invention without, however, restricting it thereto:

Example 1

25 grams of a 30 per cent aqueous formaldehyde solution are added to a solution of 10 grams of sulfuryl amide in 400 cc. of concentrated hydrochloric acid. Already after a short time the formation of a finely crystalline colorless precipitate begins, which quickly increases. After 5 hours' standing the precipitate is sucked off, washed with water and dried. Yield 12 grams.

With 60 per cent of sulfuric acid instead of hydrochloric acid the same result is achieved.

Example 2

A solution of 10 grams of sulfuryl amide in 200 cc. of concentrated hydrochloric acid is added to a solution of 6.3 grams of paraformaldehyde in 200 cc. of concentrated hydrochloric acid. The crystalline precipitate formed after a short time is sucked off after 5 hours' stirring and worked up as stated in Example 1.

Also in this example the concentrated hydrochloric acid may be replaced by 60 per cent of sulfuric acid.

Example 3

0.05 per cent of the poisonous compound is mixed with talcum, flour or fine bran. A mixture of this powder with a suitable baiting material, e. g. mashed potatoes, in the ratio of 1:10, is excellently suited for combating rats.

Example 4

From 6 per cent of methyl cellulose, a little dyestuff and the balance water, a paste is made to which 0.04 per cent of the poisonous compound is admixed. By mixing this paste with a suitable baiting material in the ratio of 1:10, or by thinly spreading it on slices of white bread, fish-heads or the like, baits are obtained which when eaten by rats will with certainty kill these rodents.

Example 5

0.01 per cent of the poisonous compound are thoroughly mixed with 10 per cent of flour; 20 per cent of fish-flour and about 70 per cent of bran are added with further mixing. 1 part of this mixture is stirred with about 2 parts of water to form a bait ready for use, which is suited for combating rats.

Example 6

100 parts of wheat are well stirred with a mixture of:

0.05 parts of the poison
0.2 parts of dyestuff
0.8 parts of water glass
4.0 parts of water The wheat grains thereby become equally covered with a dyed poisonous layer. Wheat grains thus incrusted are well taken by mice. 1 to 2 wheat grains are enough for killing one mouse.

We claim:

1. A process for preparing a highly toxic, crystalline, condensation product having the empirical formula $(C_2H_4O_2N_2S)_2$ and a decomposition point between 255 and 260° C., which comprises reacting one mol of sulfuryl amide with two mols of formaldehyde in an amount of a concentrated aqueous mineral acid substantially greater than the total amount of said reactants, and separating the crystalline precipitate formed from the solution.

2. A poison bait for rodents comprising a nutrient material attractive to rodents and an effective amount of a highly toxic, crystalline, condensation product having a decomposition point between 255 and 260° C. and being obtained by the process defined in claim 1.

3. A process of killing rodents, which comprises feeding rodents a poison bait as defined in claim 2.

GERHARD HECHT.
HANS HENECKA.
MARIANNE MEISENHEIMER.

References Cited in the file of this patent

FOREIGN PATENTS

| Number | Country | Date |
|---|---|---|
| 823,925 | France | Oct. 25, 1937 |

OTHER REFERENCES

Paquin, "Angewandte Chemie," volume A–60 (1948), pages 316 to 320.

Wood et al., J. Soc. Chem. Ind., volume 52, pages 346–9 T (1933).